United States Patent

[11] 3,593,982

| [72] | Inventor | Walter Doil Price<br>Port Arthur, Tex. |
|---|---|---|
| [21] | Appl. No. | 843,287 |
| [22] | Filed | July 11, 1969 |
| [45] | Patented | July 20, 1971 |
| [73] | Assignee | Texaco Inc.<br>New York, N.Y.<br>Continuation-in-part of application Ser. No. 634,381, Apr. 27, 1967, now abandoned. |

[54] CLAMPING APPARATUS AND METHOD OF USE THEREOF
5 Claims, 4 Drawing Figs.

[52] U.S. Cl. ................................................ 269/8,
269/254, 29/256
[51] Int. Cl. ........................................................ B25b 11/02

[50] Field of Search ............................................ 269/8, 91,
95, 97—102, 254; 29/256

[56] References Cited
UNITED STATES PATENTS

| 416,096 | 1889 | Dom ............................ | 269/254 X |
| 761,767 | 1904 | Hayden ....................... | 269/254 X |
| 2,379,136 | 6/1945 | Erwin ........................... | 269/8 |

*Primary Examiner*—Andrew R. Juhasz
*Assistant Examiner*—Donald D. Evenson
*Attorneys*—K. E. Kavanagh and Thomas H. Whaley

ABSTRACT: An L-shape clamping apparatus with magnetic means for attachment to a magnetizable structure at one end thereof and a tension member at the other end thereof for holding an object against the structure to which it is to be fastened by adhesive means, and method of use thereof.

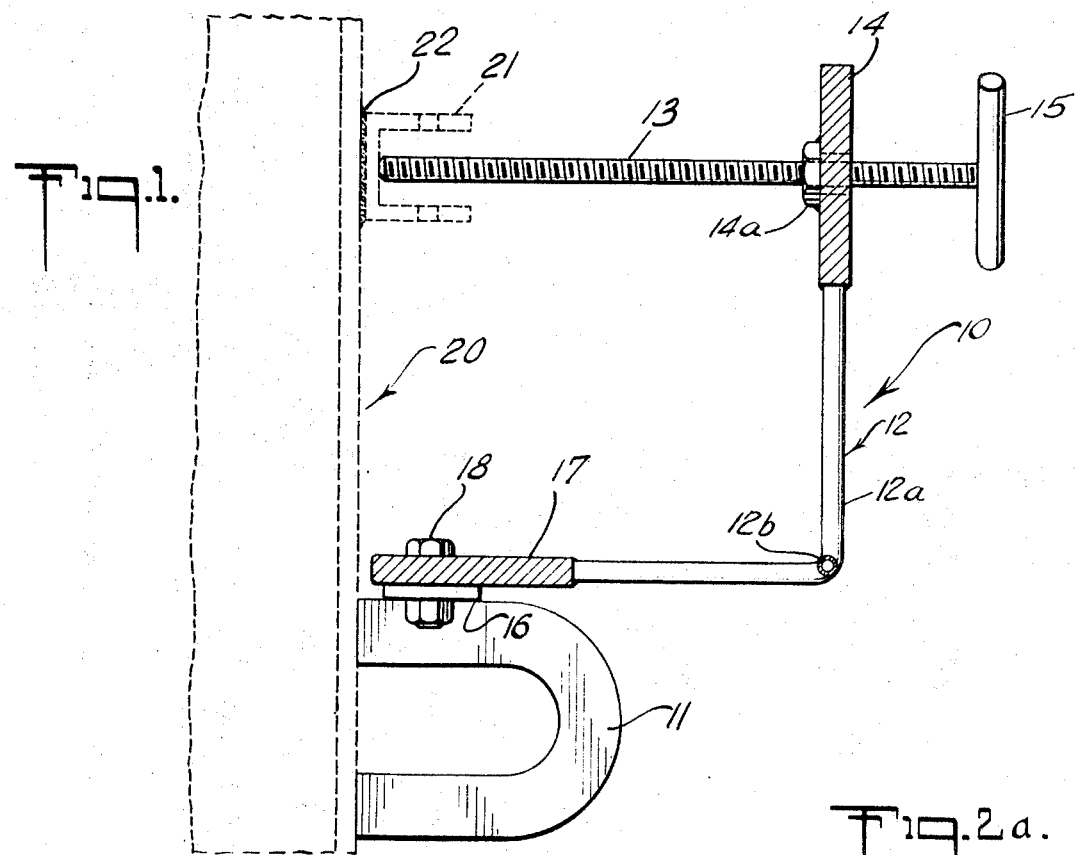
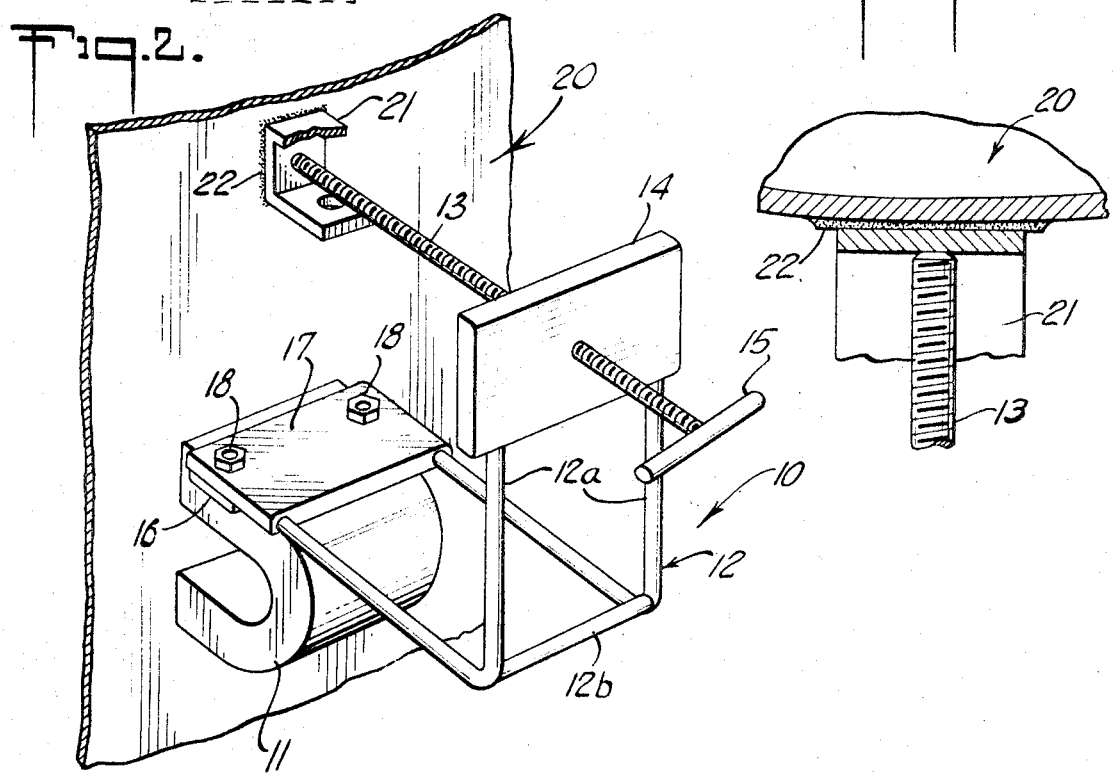

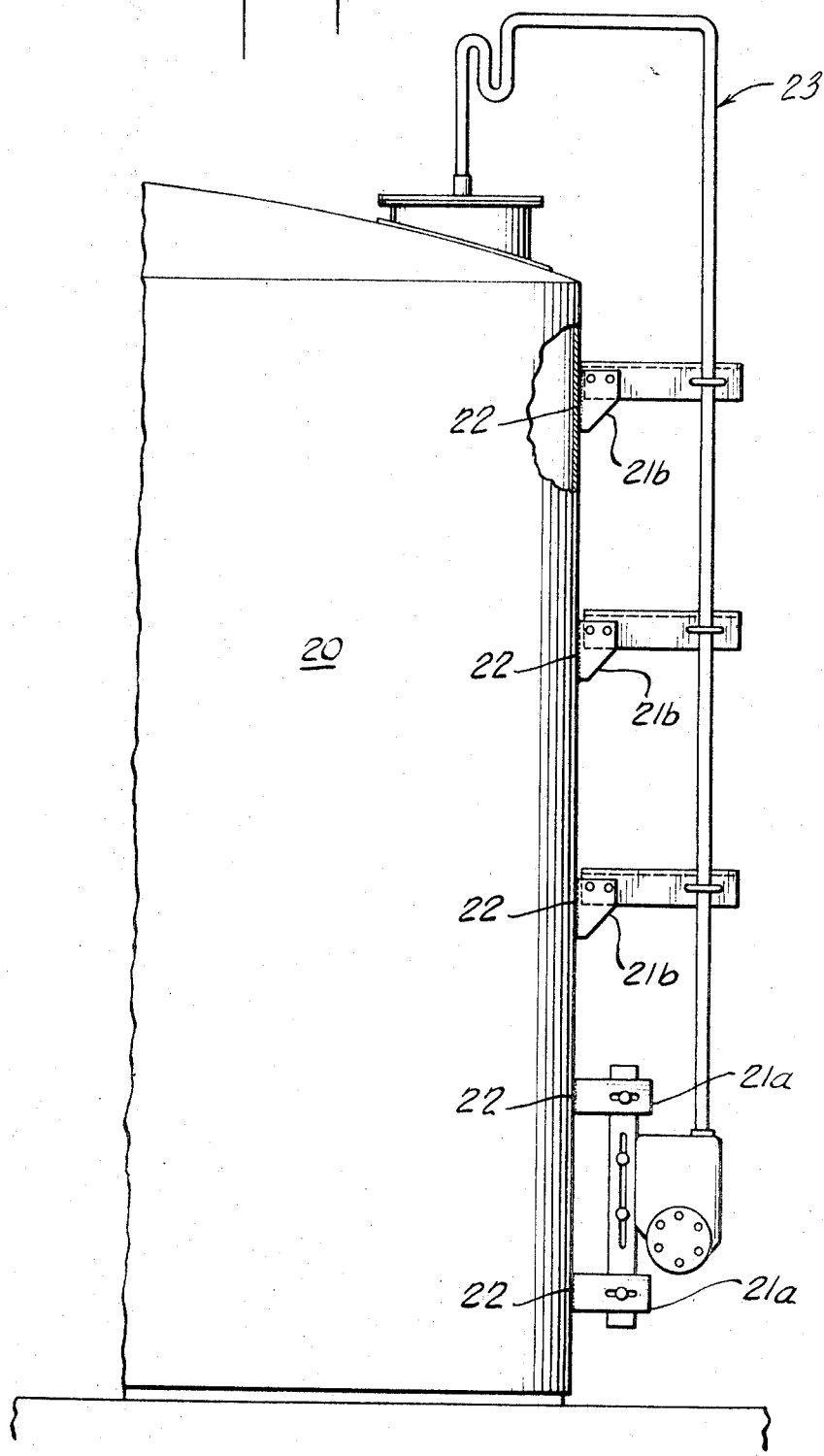

CLAMPING APPARATUS AND METHOD OF USE THEREOF

CROSS REFERENCE

This application is a continuation-in-part application for patent of the copending, commonly assigned application for U.S. Pat. Ser. No. 634,381, filed Apr. 27, 1967, now abandoned, by Walter D. Price for a Magnetic Clamp.

BACKGROUND OF THE INVENTION

The invention pertains generally to holding means and more specifically to a clamp used to apply pressure to an object being attached by a synthetic adhesive to a metallic structure.

It is customary in the storage and processing of fluids contained in large size metallic receptacles to install measuring apparatus and other gauges on the outer walls of the receptacles. Usually, supporting means for such apparatus are welded to the receptacle wall to provide a base or bases for them. The welding of additional supporting means onto the wall of a metallic receptacle holding combustible materials requires removal of the combustible materials from the receptacle as a precautionary measure. This procedure involves considerable preparation resulting in high cost and expenditure of much time. To eliminate this problem, a novel device has been developed for attaching objects to a metallic receptacle by utilizing an adhesive and thereby eliminating welding and its concomitant expenses.

SUMMARY

The invention in general provides a means for holding in place objects to be attached adhesively to a metallic structure and more particularly to a device which applies pressure to the object being attached until the adhesive bonding agent cures, although its applicability is not limited thereto.

The principal advantage made possible by use of this invention over devices and methods used in the prior art is the considerable saving of time and costs involved, since it will no longer require the removal of combustible materials from a metallic receptacle as a safety measure as when welding is to be practiced.

Utilization of an adhesive as a bonding agent for the attachment of an object to a structure is common. However, the use of certain synthetic adhesives requires that pressure be applied during the curing process for a successful bond. Merely holding the object in contact with the structure and applying pressure by hand seldom produces a bond of sufficient strength. This has been the experience even with modern day fast curing synthetic adhesives. Since a conventional clamping arrangement cannot be utilized on large structures such as circular fuel containing tanks, and welding introduces safety hazards unless the fuel therein is removed first, it is desirable therefore to use a device which will apply sufficient pressure to the object being attached during the curing process for proper bonding and so avoid the hazards of welding.

Accordingly, it is an overall object of this invention to provide a device which can hold an object in place during an adhesive bonding process.

Another object of this invention is to provide a means for the attachment of objects to combustible materials containing structures without requiring their removal therefrom or modification of the structure for machining or welding activities.

These and other objects, advantages and features of the invention will become more apparent from the following description taken in connection with the accompanying drawing.

BRIEF DESCRIPTION OF THE DRAWING

FIG. 1 is a side elevation of the magnetic clamp in position for operation;

FIG. 2 is an isometric view of the clamp in holding position;

FIG. 2a is an enlarged fragment view of the clamp in position engaging a supporting means; and FIG. 3 is a partial side elevation of a structure with supporting means attached thereto and measuring apparatus installed thereon.

DESCRIPTION OF THE PREFERRED EMBODIMENT

With reference to the drawings, the invention comprises a magnetic clamp, indicated generally at 10, shown mounted on the outer wall surface of a magnetizable metallic structure, indicated generally in phantom at 20, in a position such that it holds in place an object 21, which is to be affixed adhesively to this structure. As illustrated, the clamp is attached to structure 20 by a magnetic-holding device 11, which in turn provides support for frame member 12 fastened in cantilever relationship thereto. Frame member 12 comprises a pair of flexible rodlike members 12a joined at their adjacent ends by supporting plates 14 and 17 and, when necessary, is provided with a reinforcing bar 12b interposed for additional lateral rigidity. The frame member 12 is shown in an L-shaped configuration and provides a support base for a threaded tension member 13 by which pressure is to be applied to the object 21 to be affixed to structure 20. Proper adhesive affixture of object 21 to structure 20 requires that a uniform force be applied to the object for a sufficient length of time to result in an adequate bond, as is necessary for the successful use of certain epoxy compounds.

To achieve a uniform force for a length of time, the invention is provided with a tension member, indicated at 13, which can apply varying degrees of force to the object 21 to be affixed to the structure 20. The tension member 13 is threaded for the entire length and is supported by threaded means, e.g. nut 14a fastened to supporting plate 14 of frame member 12. For ease of operation, tension member 13 is provided with a handle 15 on one end thereof which provides an easy means for rotation. Tension member 13 is aligned approximately with the center of object 21 and rotated until the desired holding force is applied to the object 21 and maintained in that position until the bonding agent indicated at 22 adequately cures. Although sufficient holding force is a requirement, an excess should not be used, inasmuch as the adhesive would be squeezed out and its bonding function reduced. Consequently, while the main holding force is applied via the tension member with a proper thickness of adhesive, some holding force is applied via the resiliency of the flexible, rodlike members 12a.

In summary, upon attachment of the holding device 11 to the structure, the object to be affixed is either coated with an adhesive on its contacting surface or is positioned on adhesive previously applied to the container and then held in position primarily by tension member 13 and somewhat by the resiliency of the rodlike members 12a, the sum of the forces being adequate to furnish proper holding during the adhesive curing process. When the object being affixed is very large, the base of tension member 13 may be provided with a plate head at its contact end to disperse the exerted force over a larger area of the object.

The supporting plate 14 of frame member 12 is spaced from structure 20 and the magnetic-holding device 11 at a distance such that a sufficient amount of force may be applied to object 21 without disengaging the magnetic-holding device 11 from the structure 20. The magnetic-holding device is of a sufficient holding capacity to support the weight of the clamp and to counteract the force exerted by the tension member 13. Attached to the magnetic-holding device 11 is a plate 16 containing perforations therein which provide a means for fastening the supporting plate 17 of frame member 12 to the magnetic holding device 11, utilizing threaded fasteners indicated at 18. The magnetic-holding device 11, bolted to the leg of frame member 12 which is substantially perpendicular to the surface of structure 20, comprises a permanent magnet. It is evident that an electromagnet (not shown) or other means for attachment of the invention to the structure could be substituted.

In order to permanently fasten the object 21 to the structure, the clamping means is left in place with the tension member 13 applying pressure against object 21 during the period required for the proper curing of the bonding agent. It should be recognized that the invention as illustrated may be used also to hold an object in place while it is being welded or affixed to the structure by other means.

FIG. 3 illustrates a plurality of objects or supporting means or members attached to a structure by the clamping means herein disclosed. The objects indicated generally at 21a and 21b provide supporting means for the measuring apparatus 23 used in conjunction with the processing of the fluids contained in the structure 20.

Thus, there has been shown and described an apparatus and method of use thereof which eliminates the necessity of welding, and its attendant requirement of tank purging of combustible materials, when additional supporting means, such as brackets for measuring apparatus, are required to be affixed to storage tanks and the like.

I claim:

1. Clamp means for affixing an object to a magnetizable metallic structure by utilizing an adhesive bonding agent comprising a magnetic-holding device for attaching said clamp means to said metallic container and an L-shaped frame member joined in cantilever relationship thereto such that the outboard leg thereof is substantially parallel to said metallic structure and spaced therefrom when said magnetic-holding device is in operative position, a threaded tension member rotatably supported by said outboard leg providing means for resiliently holding in place said object to be affixed to said metallic structure, the support position of said tension member being such as to apply a sufficient amount of holding force to said object without disengagement of said magnetic-holding device from said metallic structure.

2. A device as defined in claim 1, wherein said L-shaped frame member comprises a pair of juxtaposed flexible rodlike, L-shaped members and supporting plates interposed and joining the adjacent ends of said rodlike members, one plate being attached to said magnetic-holding device, and the other plate providing support for said tension member, said metallic structure comprising a container holding combustible materials, said object comprising an apparatus supporting member.

3. A method of adhesively affixing supporting means to a magnetizable structure comprising the steps of attaching a magnetic clamp to said structure, positioning said supporting means adjacent said structure with adhesive means requiring a predetermined curing time for proper bonding between said supporting means and said structure, and applying a holding force to said supporting means for said predetermined time via a threaded tension member supported resiliently by flexible rodlike members attached to said magnetic means.

4. In a method as defined in claim 3, said adhesive means being applied to said structure at the position where said supporting means are to be affixed.

5. In a method as defined in claim 3, said adhesive means being applied to the surface of said supporting means to be affixed to said structure prior to being positioned on said structure.